March 4, 1958     J. W. BRADBURY     2,825,552
INDEPENDENT WHEEL SUSPENSION
Filed Dec. 20, 1954
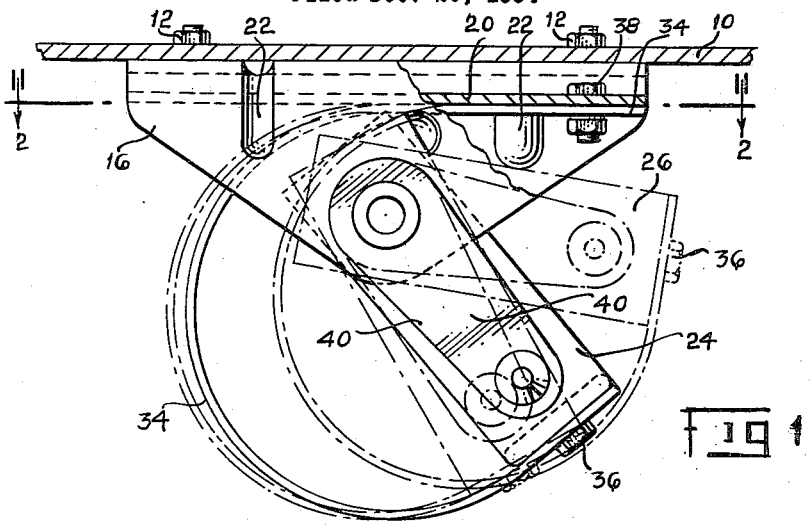
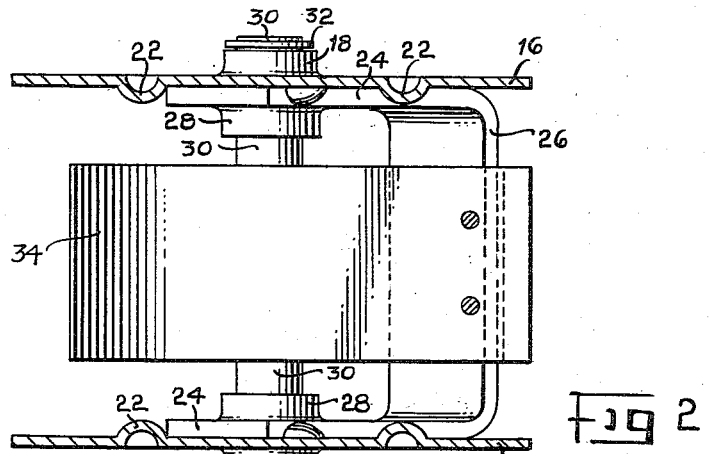
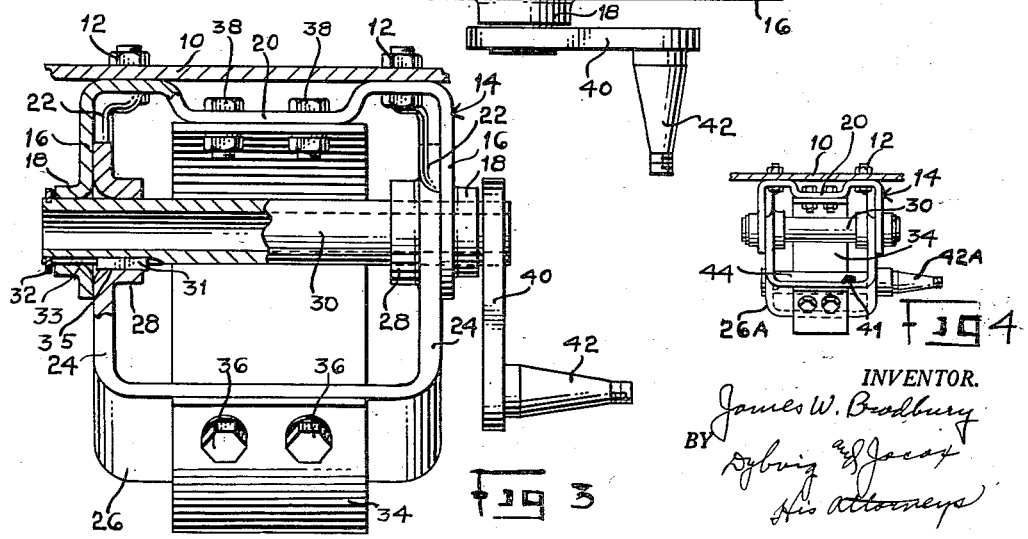
INVENTOR.
James W. Bradbury
BY Dybvig and Jacox
His Attorneys

United States Patent Office 2,825,552
Patented Mar. 4, 1958

2,825,552
INDEPENDENT WHEEL SUSPENSION

James William Bradbury, Dayton, Ohio, assignor to John M. Beach, Dayton, Ohio

Application December 20, 1954, Serial No. 476,517

2 Claims. (Cl. 267—19)

This invention relates to a device for independent wheel suspension, and has for its object the provision of a new and improved means for wheel and load mounting in trailer and other vehicles.

The invention has for its object the provision of a new and useful means for wheel suspension.

A further object of the invention is the provision of a wheel suspension device which functions as a shock absorber.

A further object of the invention is the provision of a safety device in a shock absorbing wheel suspension, which will continue to support and carry the load, even in the event that portions of the device fail.

A further object of the invention is the provision of a wheel suspension device wherein the point of suspension of the load is out of vertical alignment with the point of suspension of the wheel, and wherein these two points are connected by a resilient shock absorbing and shock dampening member, and wherein the construction is such that the angle between them with respect to the vertical is flexible and alterable within limits.

A further object of the invention is the provision of a shock absorbing and shock dampening means for a wheel suspension device, wherein the shock absorbing means includes a spring, and wherein the impact of the load and the jarring thrust due to shock are dampened in some ratio proportional to the length of the spring and to its resilient quality A further object of the invention is the provision of a device for wheel suspension wherein a dead center is never reached between the point of suspension of the load and the point of suspension of the wheel.

A further object of the invention is the provision of wheel suspension means wherein the downward thrust of a loaded vehicle is partially converted into an upward thrust by means of a chosen configuration of dampening element, and by the unique arrangement of parts; and conversely, by the same arrangement of parts, the upward thrust sustained by a wheel of a vehicle, is dampened and cushioned before it reaches the vehicle.

Further objects and advantages reside in the construction of parts, the combination thereof and the mode of operation, as will become more apparent from the following description.

In the drawing,

Figure 1 is a side elevational view of the suspension device, showing parts in cross section.

Figure 2 is a horizontal cross section taken substantially on the line 2—2 of Figure 1.

Figure 3 is an end elevational view with parts broken away.

Figure 4 is a perspective view of a modification.

Referring more in detail to the drawing, the element 10 may be a leaf spring, a bracket or a mounting plate attached to the body of a vehicle, or it may be a portion of the vehicle itself. Secured to the element 10 by means of bolts 12 is a member 14 substantially of an inverted U-shape in cross section. This is shown best in Figure 3. A pair of depending arms 16 of the member 14 are each provided with an outwardly extending annular flange 18. The flanges 18 form supports in which a pivotal member is journaled for rotary movement.

The horizontal mid-portion of the member 14 is provided with an offset portion 20 which is spaced below and is parallel to the member 10.

The member 16 is provided with one or more ribs 22 struck into the body thereof, and are for reinforcement. The ribs 22, in addition to their function of reinforcement, act as stops for limiting the movement of a U-shaped member 26. This is shown best in Figure 1. The arms 24 of the U-shaped member 26 are provided with inwardly extending annular flanges 28. The circular openings provided by the two pairs of annular flanges 18 and 28 are adapted to be brought into registry to form a support for each end of a cylindrical axis member 30 shown in the form of a hollow cylinder in Figure 3.

The flange member 18 forms a journal for relative rotation of the member 30 with respect thereto. Key 31 is inserted in complementary key slots 33 and 35 in members 30 and 28 respectively, and locks these members together for movement together.

The cylindrical member 30 is retained in its journaled position within the flange 18 by any expedient means. The means shown in the drawing is a spring ring or retaining ring 32. The U-shaped member 16 has a rigid position with respect to the body or spring member 10. The cylinder 30 is journaled in the bracket 16 and the arms 24 of the U-member 26 are keyed to the cylindrical member 30, and rotate therewith.

A substantially semi-circular leaf spring member 34 is attached at one end to the horizontal portion of the U-shaped member 26 by a pair of bolts 36. The opposite end of the spring member 34 is attached by means of bolts 38 to the offset horizontal portion 20 of the member 14.

An arm member 40 is rigidly attached adjacent one end to the cylindrical member 30, and is rigidly attached adjacent its other end to a sub-axle or pintle member 42. A wheel, not shown, is mounted upon the axle 42.

It will thus be seen that upward and downward movement of the axle of the wheel, due to jarring and bumps encountered in roadways, or from any other cause, is absorbed or cushioned by the spring member 34, permitting rotation of the member 30. The arm 40 swings about axis member 30 as a center, through a substantial 45° angle as shown in Figure 1. The cylindrical member 30 rotates with it, and the U-bracket to which it is keyed rotates with it. The action is dampened by the semi-circular spring 34 operating between the U-member 26 and the vehicle body. Cushioning and dampening and shock absorbing are thus effected between the load and the axle of the wheel.

In the event that the spring member 34 becomes damaged or is broken, member 26 approaches a horizontal position; but reaches a limit of its motion when it seats against the arm 16. The load of the vehicle is still supported, although now without cushion.

The cylindrical member 30, carrying the load of the vehicle and the axle or pintle member 42, which is the point of suspension of the wheel of the vehicle, do not lie in the same vertical plane. The arm member 40, pivoting about the point of application of the load, effects relative arcuate movement of the axle 42. The effective connection between these two points is the semi-circular leaf spring 34.

The modification shown in Figure 4 is similar in all respects to that just described, with one major exception. The intermediate arm member 40 of Figures 1, 2 and 3 is dispensed with. The axle 41 is rigidly attached directly to the U-member 26A. A stub axle 44 extends between the arms of the U-bracket 26A, and projects therebeyond in the form of a tapered wheel supporting portion 42A.

In all other respects, the respective parts and their operation are identical with the device of Figures 1, 2 and 3, and the description, therefore, need not be repeated.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. An independent wheel suspension for attachment to the body of a vehicle comprising, in combination, a bracket member for attachment to the vehicle, a horizontally disposed cylindrical member journalled in said bracket member, a pivotal member supported by said cylindrical member and keyed thereto so as to be pivotal relative to the bracket member, an arm secured to said cylindrical member, a horizontally disposed pintle for supporting a wheel of said vehicle attached to said arm, means integral with said bracket member for limiting the pivotal motion of the pivotal member, and a semi-circular leaf spring subjected to bending forces under the weight of said vehicle operating between said bracket member and said pivotal member for restraining the pivotal motion of said pivotal member.

2. An independent wheel suspension for attachment to the body of a vehicle comprising, in combination, a bracket member for attachment to the vehicle, a horizontally disposed cylindrical member journaled in said bracket member, a pivotal member supported by said cylindrical member and keyed thereto so as to be pivotal relative to the bracket member, a horizontally disposed pintle for supporting a wheel of said vehicle, means supporting said pintle in fixed eccentric relation to said cylindrical member, means integral with said bracket member for limiting the pivotal motion of the pivotal member, and a semi-circular leaf spring subjected to bending forces under the weight of said vehicle operating between said bracket member and said pivotal member for restraining the pivotal motion of said pivotal member.

References Cited in the file of this patent

UNITED STATES PATENTS

| | | |
|---|---|---|
| 1,922,339 | Woolley | Aug. 15, 1933 |
| 2,092,613 | Olley | Sept. 7, 1937 |
| 2,472,686 | Snyder | June 7, 1949 |
| 2,495,449 | Francis | Jan. 24, 1950 |
| 2,692,098 | Schmued et al. | Oct. 19, 1954 |
| 2,701,727 | Linn | Feb. 8, 1955 |

FOREIGN PATENTS

| | | |
|---|---|---|
| 159,669 | Great Britain | Mar. 10, 1921 |